US006690414B2

(12) United States Patent
Lyons et al.

(10) Patent No.: US 6,690,414 B2
(45) Date of Patent: Feb. 10, 2004

(54) METHOD AND APPARATUS TO REDUCE FALSE ALARMS IN EXIT/ENTRANCE SITUATIONS FOR RESIDENTIAL SECURITY MONITORING

(75) Inventors: Damian M. Lyons, Putnam Valley, NY (US); Eric Cohen-Solal, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 253 days.

(21) Appl. No.: 09/734,770

(22) Filed: Dec. 12, 2000

(65) Prior Publication Data

US 2002/0071032 A1 Jun. 13, 2002

(51) Int. Cl.[7] ............................ H04N 7/18; H04N 9/47

(52) U.S. Cl. ....................................... 348/156; 348/156

(58) Field of Search ................................ 348/143, 152, 348/156; 382/118, 156, 195, 224; H04N 7/18, 9/47

(56) References Cited

U.S. PATENT DOCUMENTS

| | | | | | |
|---|---|---|---|---|---|
| 5,091,780 | A | * | 2/1992 | Pomerleau | 348/152 |
| 5,164,827 | A | * | 11/1992 | Paff | 348/143 |
| 5,606,364 | A | * | 2/1997 | Kim | 348/159 |
| 5,657,076 | A | | 8/1997 | Tapp | |
| 5,704,008 | A | * | 12/1997 | Duvall, Jr. | 704/273 |
| 5,831,669 | A | | 11/1998 | Adrain | |
| RE36,041 | E | * | 1/1999 | Turk et al. | 382/118 |
| 5,982,418 | A | | 11/1999 | Ely | |
| 5,991,429 | A | | 11/1999 | Coffin et al. | |
| 6,069,653 | A | | 5/2000 | Hudson | |
| 6,069,655 | A | | 5/2000 | Seeley et al. | |
| 6,111,517 | A | * | 8/2000 | Atick et al. | 340/5.83 |
| 6,128,397 | A | * | 10/2000 | Baluja et al. | 382/118 |
| 6,282,649 | B1 | * | 8/2001 | Lambert et al. | 713/167 |
| 6,292,575 | B1 | * | 9/2001 | Bortolussi et al. | 382/118 |
| 6,301,370 | B1 | * | 10/2001 | Steffens et al. | 382/103 |

FOREIGN PATENT DOCUMENTS

| | | | | |
|---|---|---|---|---|
| EP | 0962894 A2 | | 8/1999 | G07C/9/00 |
| EP | 0962894 | * | 12/1999 | G07C/9/00 |
| GB | 2223614 A | | 4/1990 | |
| GB | 2343945 A | | 5/2000 | |
| JP | 11-328405 | | 11/1999 | |

OTHER PUBLICATIONS

Rowley, H.A., et al., "Human Face Detection in Visual Scenes", Advances in Neural Information Processing Systems 8, Proceedings of the 1995 Conference, pp. 875–881, 1996.

(List continued on next page.)

*Primary Examiner*—Nhon Diep
(74) *Attorney, Agent, or Firm*—Gregory L. Thorne

(57) ABSTRACT

A security monitoring system including: an alarm system having detectors for detecting an unauthorized individual in a structure; at least one camera for capturing first image data of the unauthorized individual; a memory for storing second image data of at least one individual authorized to be in the structure; and a data link for transmitting third image data to a remote location upon the detection of the unauthorized individual. The third image data including at least portions of the first and second image data for comparison at the remote location. In a preferred implementation, the first image data includes image data of more than the face of the unauthorized individual and the system further includes a computer vision system for detecting the face of the unauthorized individual from the first image data. In such an implementation, the first and second image data are face images and are arranged in a picture having the unauthorized individual at a top portion of the picture and the authorized individuals arranged along a bottom row of the picture.

20 Claims, 2 Drawing Sheets

OTHER PUBLICATIONS

Rowley, H.A., et al., "Rotation Invariant Neural Network–Based Face Detection", Proceedings, 1988 IEEE Computer Society Conference on Computer Vision and Pattern Recognition, pp. 38–44, 1998.

Raja, Y., et al., "Segmentation and Tracking Using Colour Mixture Models", Computer Vision—ACCV '98, Third Asian Conference on Computer Vision, Hong Kong, China, Jan. 1998, Proceedings, vol. 1.

Lee, C.H., et al., "Automatic Human Face Location in Complex Background Using Motion and Color Information", Pattern Recognition, vol. 29, No. 11, pp. 1887–1889, 1996.

Gutta, S., et al., "Face Surveillance", Sixth International Conference on Computer Vision, The Institute of Electrical and Electronics Engineers, Inc., pp. 646–651.

Stauffer, C., "Automatic hierarchical classification using time–based co–occurrences", IEEE Computer Society Technical Committee on Pattern Analysis and Machine Intelligence, vol. 2, pp. 333–339.

Grimson, W.E.L., et al., "Using adaptive tracking to classify and monitor activities in a site", Proceedings 1988, IEEE Computer Society Conference on Computer Vision and Pattern Recognition, pp. 22–29, 1998.

* cited by examiner

METHOD AND APPARATUS TO REDUCE FALSE ALARMS IN EXIT/ENTRANCE SITUATIONS FOR RESIDENTIAL SECURITY MONITORING

BACKGROUND OF THE INVENTION

1. Field of the Invention

The present invention relates generally to security monitoring systems and, more particularly, to a security monitoring system in which image data captured upon the occurrence of an alarm is transmitted to a remote location along with image data of authorized individuals for comparison by personnel at the remote location.

2. Prior Art

Security monitoring systems of the prior art, particularly residential security systems, typically utilize a box that monitors contact sensors for doors and windows and one or more infra-red sensors for area monitoring. When a contact is triggered or an infra-red sensor triggers, an alarm is sounded and a signal is sent via a data link such as a phone line to a central monitoring site. The central monitoring site typically initiates a set of phone calls, to the homeowner, to work, and/or to a designated neighbor to determine if the alarm signal was due to an unauthorized intruder or just to an accidental triggering by a family member or other authorized occupant of the structure.

If the alarm signal cannot be resolved by the phone calls, it is passed to the local police department. According to the International Association of Police Chiefs (www.theiacp.org), 94 to 98% of the calls passed to the police department turn out to be "false alarms" in the sense that they were not due to an unauthorized intruder, and alarm calls are responsible for 10 to 30% of all calls to the police.

Significant portions (over 70%) of "false alarms" are caused by what is referred to as exit/entrance conflicts. For instance, in the situation of a residential alarm system, the homeowner or other authorized occupant of a residence often arms the security system while leaving the residence and shortly thereafter realizes that they have forgotten something in the residence. As they return to the residence, they enter without disarming the system thereby causing an alarm to be sounded and/or an alarm signal to be sent to a central monitoring site, or in attempting to disarm the system in a hurry enter the wrong code with the same result. Similarly, the homeowner may arm the security system and remain inside the residence, such as during the night and may thereafter leave to get something outside the residence, e.g., the morning paper, thereby triggering a false alarm.

In view of the prior art, there is a need for a security monitoring system, which resolves these and other types of entry/exit conflicts.

SUMMARY OF THE INVENTION

Therefore it is an object of the present invention to provide a security monitoring system which reduces the number of false alarms inherent in the prior art security monitoring systems.

Accordingly, a security monitoring system is provided. The security monitoring system comprises: an alarm system having means for detecting an unauthorized individual in a structure; at least one camera for capturing first image data of the unauthorized individual; a memory for storing second image data of at least one individual authorized to be in the structure; and transmitting means for transmitting third image data to a remote location upon the detection of the unauthorized individual, the third image data comprising at least portions of the first and second image data for comparison at the remote location. The system can further comprise means for compressing the third image data prior to transmission to the remote location.

In a preferred implementation of the security monitoring system of the present invention, the at least one camera also captures the second image data to be stored in the memory. Means is preferably provided for commanding the at least one camera to capture the second image data. Preferably, the means for commanding the at least one camera to capture the second image data comprises entering a unique key sequence on a keypad associated with the alarm system.

In yet another preferred implementation of the security monitoring system of the present invention, the first image data comprises image data of more than the face of the unauthorized individual and the system further comprises a computer vision system for detecting the face of the unauthorized individual from the first image data. In such an implementation, the second image data comprises face image data of the authorized individual and the third image data comprises a comparison of face image data of the unauthorized and authorized individuals.

Preferably, the third image data is composed in a picture comprising a frame from the video image data arranged in a first portion and the still image data of the at least one individual authorized to be in the structure arranged in a second portion. More preferably, the first portion comprises a top portion of the picture and the second portion comprises a row of the still image data for each of the at least one individuals authorized to be in the structure arranged along a bottom portion of the picture.

Also provided are methods for security monitoring of a structure having the security monitoring system of the present invention.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of security monitoring systems, it has been found particularly useful in the environment of residential security monitoring systems. Therefore, without limiting the applicability of the invention to residential security monitoring systems, the invention will be described in such environment.

Figure 1:
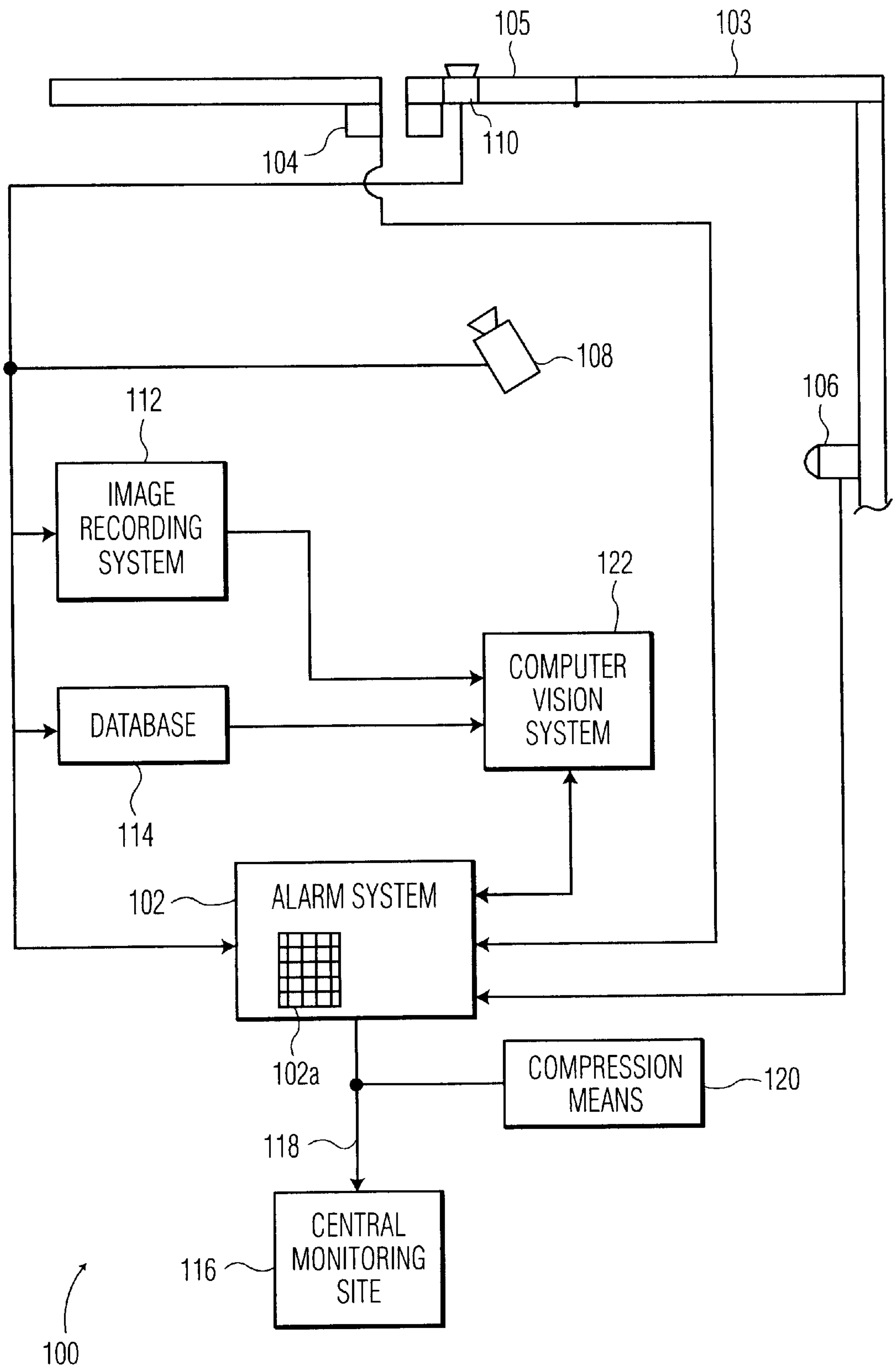
FIG. 1 illustrates a schematical view of a structure having the security monitoring system of the present invention.

Referring now to FIG. 1, there is illustrated a preferred implementation of a security monitoring system of the present invention, referred to generally by reference numeral 100. The security monitoring system comprises an alarm system 102 having means for detecting an unauthorized individual in a structure 103. Such means can be any conventional detectors known in the art, such as magnetic door contacts 104 for detecting the opening of an entrance door 105 or an infrared motion detector 106 appropriately positioned to detect the presence of an unauthorized intruder. Those skilled in the art will recognize that any such type of conventional detectors may be used without departing from the scope or spirit of the present invention. By "unauthorized individual" it is meant any individual whose entry or exit will cause the alarm system to be triggered, such individual may turn out to be an authorized individual in an exit/entry conflict as discussed above.

The security monitoring system 100 of the present invention also comprises at least one camera 108 for capturing image data of the unauthorized individual. The camera 108 is preferably a still video camera. However a pan-tilt-zoom (PTZ) camera can also be utilized. The at least one camera 108 can be positioned in an entrance hallway positioned to capture video sequences of the doorway. However, a camera 110 located in the door 105 can also be used to capture image data of the unauthorized individual as is described in co-pending U.S. patent application Ser. No. 09/734,780 (Docket No. 701662, 13935) which is incorporated herein by its reference.

An image recording system 112 can be utilized to record the image data from the camera(s) 108 (110) for further processing or the image data can be processed "on the fly" without such recordation. Preferably, the entire video sequence from the camera(s) 108 (110) is recorded as long as the unauthorized individual is in the camera's field of view. It is preferred that the image recording system 112 is preferably a computer or other processor having a storage device such as a hard drive and an image capture card. However, those skilled in the art will recognize that the image recording system 112 can be of any type known in the art without departing from the scope and spirit of the present invention.

A memory 114 is also provided for storing image data of at least one individual authorized to be in the structure. In the case of a residential application for the security monitoring system 100, the authorized individuals can include the family members residing in the residence as well as a maid or others who frequent the residence and have permission to enter the residence. The at least one camera 108 can also be used to capture the image data of the authorized individuals. Alternatively, a separate camera can be provided (not shown) for capturing the image data of the authorized individuals. The image data of the authorized individuals can be either video image data or still image data.

Preferably, the security monitoring system 100 also has means for commanding the at least one camera 108 to capture the image data of the authorized individuals. Such a means can include entering a unique key sequence on a keypad 102*a* associated with the alarm system 102. Thus, an authorized individual, or supervisor of the system, can enter the unique key sequence, and stand in a designated area such that the at least one camera 108 has a clear view of the individual, preferably a close-up view of his or her face. These images are stored in the database 114, which is preferably a non-volatile memory contained in the alarm system 102.

Upon the detection of the unauthorized individual by triggering any of the detectors 104, 106 of the alarm system 102, the image data of the unauthorized individual and the image data of the authorized individuals are transmitted to a remote location such as a police station or central monitoring site 116. Personnel at the remote location can then perform a visual inspection and comparison of the unauthorized individual and the authorized individuals to determine if the unauthorized individual is an intruder or if an entry/entrance conflict exists where the unauthorized individual is really one of the authorized individuals, in which case the remote location would classify the alarm as a false alarm. The transmission of the image data is preferably done via a data link 118 such as a telephone line (POTS). The transmission means (not shown) is preferably a built-in function of the alarm system 102 and can include any device such as a modem which transmits data via a data link 118 such as a telephone, ISDN, or coaxial cable line. Alternatively, a compression means 120 can be utilized for compressing the transmitted image data prior to transmission to the remote location 116. Any compression standard known in the art can be used for compressing the image data such as JPEG (for still image data) or MPEG (for video image data).

The image data transmitted to the remote location 116 preferably comprises a frame of the video image data of the unauthorized individual. The frame is preferably a picture of the unauthorized individual's face. In the case where the image data of the unauthorized individual is video image data and comprises image data of more than the face of the unauthorized individual, the system 100 further comprises a computer vision system 122 for detecting the face of the unauthorized individual from the image data. Such vision systems and algorithms are well known in the art, such as that disclosed in H. Rowley et al., *Human Face Detection in Visual Scenes*, Advances in Neural Information Processing Systems 8, 1996, pp. 875–881 and H. Rowley et al., *Rotation Invariant Neural Network-Based Face Detection*, proceedings of IEEE Conference on Computer Vision and Pattern Recognition, June, 1998. Briefly, such systems look for skin color among the pixels of the image data (since skin color has a distinctive hue). If a grouping of skin color pixels is above a threshold (i.e., 20% of the image data), the computer vision system 122 concludes that the grouping may be a face. If other criteria is met for the grouping, such as having an elliptical shape and regions which appear to be facial features (e.g., two eyes, a nose, and a mouth), the computer vision system 122 concludes that the grouping of pixels is the face of the unauthorized individual. That grouping of pixels is cropped from the image data and transmitted to the remote location 116 as being representative of the unauthorized individual's face. The particular image data (e.g., frame, or portion thereof) of the unauthorized individual that is transmitted to the remote location 116 can be selected by applying a set of predetermined criteria to each frame to obtain a ranking of the frames, in which case the frame with the best ranking is transmitted to the remote location 116. Such a system is described in co-pending U.S. patent application Ser. No. 09/730,677 (Attorney Docket No. 701679, 13937) which is incorporated herein by its reference.

The image data for the authorized individuals is also preferably facial image data. However, no such face detection system is necessary, since the image data of the authorized individuals is captured under controlled conditions, preferably, to only capture facial image data. However, if video image data is captured of the authorized individuals, the computer vision system 122 can also be utilized to detect the faces of the authorized individuals.

Figure 2:
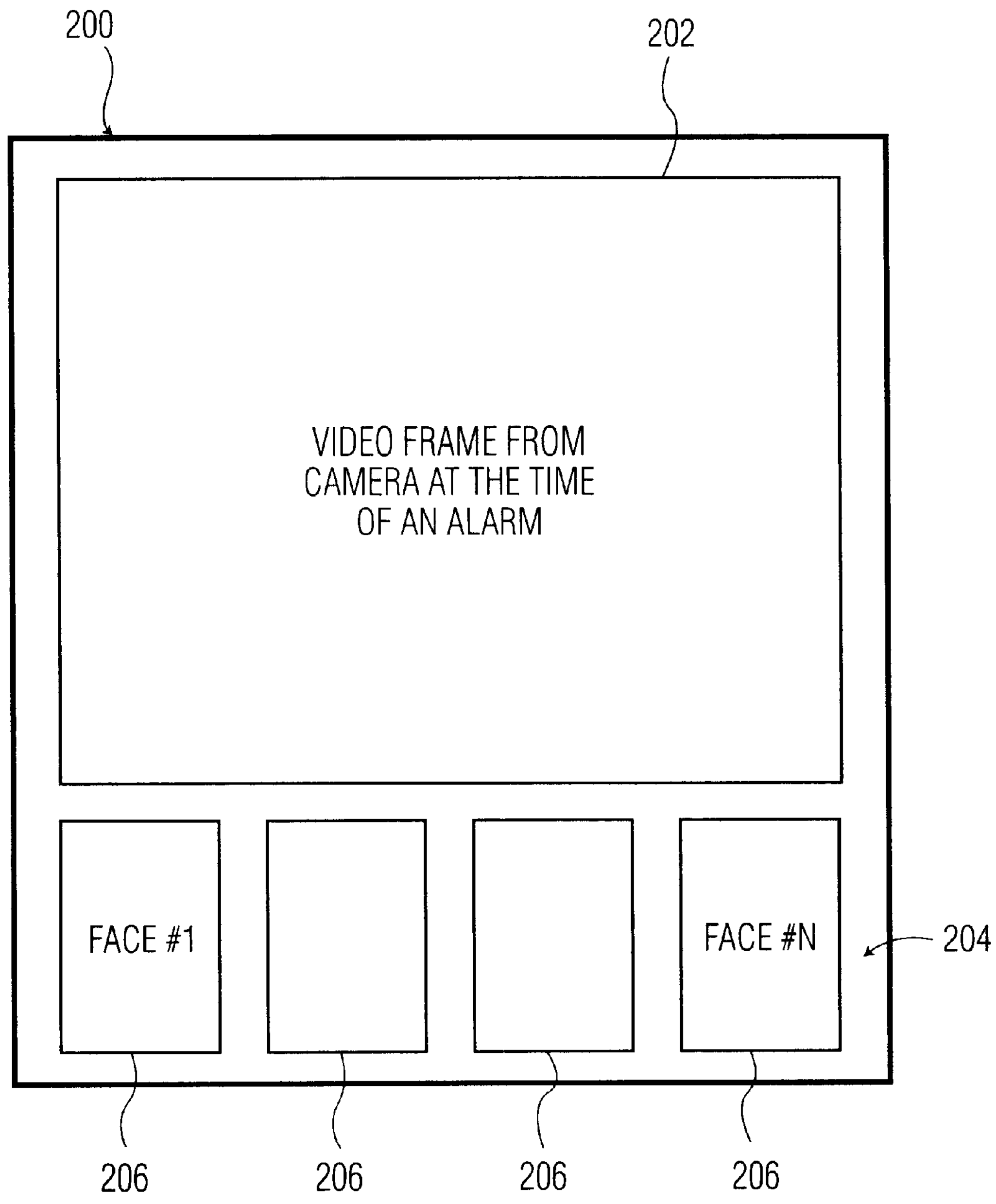
FIG. 2 illustrates a preferred picture composition transmitted to a remote location upon the occurrence of an alarm signal.

Referring now to FIG. 2, to aid in the comparison of the image data of the unauthorized and authorized individuals, the transmitted image data is not only preferably facial image data as discussed above, but also composed in a picture 200 comprising a frame 202 from the video image data of the unauthorized individual arranged in a first portion and the facial image data of the individuals authorized to be in the structure arranged in a second portion. Preferably, as illustrated in FIG. 2, the first portion comprises a top portion of the picture and the second portion comprises a row 204 of the facial image data 206 for the individuals authorized to be in the structure arranged along a bottom portion of the picture. FIG. 2 illustrates four pictures of the authorized individuals along the bottom row 204 of the picture 200. Those skilled in the art will recognize that any number of pictures of authorized individuals can be arranged on the bottom row 204, however, the greater the number, the smaller the facial images, which makes the comparison of the facial images of the authorized individuals with that of the unauthorized individual more difficult. Additional composite images 200 may be transmitted, if the number of authorized individuals would result in facial images 206 too small to be used in identification. Each composite image 200 is composed of the frame 202 and some images of the authorized individuals 206. The number of authorized images 206 included in each picture is such as to allow the images to be big enough for identification. The total number of composite images 200 sent is such that all authorized individuals are included in at least one composite image.

It should be apparent to those skilled in the art that the security monitoring system and methods of the present invention has the ability to filter out false alarms caused by the entry/exit conflicts described above. This saves a monitoring company a great deal of time and expense, and saves a homeowner or proprietor from the nuisance of false alarms and may also save expense, as some police departments charge a fee for false alarm calls.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A security monitoring system comprising:

an alarm system having means for detecting an unauthorized individual in a structure;

at least one camera for capturing first image data of the unauthorized individual;

a memory for storing second image data of at least one individual authorized to be in the structure; and transmitting means for transmitting third image data to a remote location upon the detection of the unauthorized individual, the third image data comprising at least portions of the first and second image data for comparison at the remote location.

2. The security monitoring system of claim 1, further comprising means for compressing the third image data prior to transmission to the remote location.

3. The security monitoring system of claim 1, wherein the at least one camera also captures the second image data.

4. The security monitoring system of claim 3, further comprising means for commanding the at least one camera to capture the second image data.

5. The security monitoring system of claim 4, wherein the means for commanding the at least one camera to capture the second image data comprises entering a unique key sequence on a keypad associated with the alarm system.

6. The security monitoring system of claim 1, wherein the first image data comprises image data of more than the face of the unauthorized individual and the system further comprises a computer vision system for detecting the face of the unauthorized individual from the first image data.

7. The security monitoring system of claim 6, wherein the second image data comprises face image data of the authorized individual and the third image data comprises a comparison of face image data of the unauthorized and authorized individuals.

8. The security monitoring system of claim 1, wherein the transmitting means comprises a data link between the structure and the remote location.

9. The security monitoring system of claim 1, wherein the first image data is video image data.

10. The security monitoring system of claim 9, wherein the second image data is still image data.

11. The security monitoring system of claim 10, wherein the third image data is composed in a picture comprising a frame from the video image data arranged in a first portion and the still image data of the at least one individual authorized to be in the structure arranged in a second portion.

12. The security monitoring system of claim 11, wherein the first portion comprises a top portion of the picture and the second portion comprises a row of the still image data for each of the at least one individuals authorized to be in the structure arranged along a bottom portion of the picture.

13. A method for security monitoring of a structure, the method comprising the steps of:

storing second image data of at least one individual authorized to be in the structure;

detecting an unauthorized individual in the structure;

capturing first image data of the unauthorized individual; and transmitting third image data to a remote location upon the detection of the unauthorized individual, the third image data comprising at least portions of the first and second image data for comparison at the remote location.

14. The method of claim 13, further comprising the step of compressing the third image data prior to the transmitting step.

15. The method of claim 13, further comprising the step of capturing the second image data prior to the storing step.

16. The method of claim 15, further comprising the step of commanding the capturing of the second image data.

17. The method of claim 16, wherein the commanding step comprises entering a unique key sequence on a keypad associated with an alarm system for detecting the unauthorized individual in the structure.

18. The method of claim 13, wherein the first image data comprises image data of more than the face of the unauthorized individual and the method further comprising the step of detecting the face of the unauthorized individual from the first image data.

19. The method of claim 13, further comprising the step of composing the third image data in a picture such that the first image data is a frame from video image data arranged in a first portion and the second image data is still image data of the at least one individual authorized to be in the structure arranged in a second portion.

20. The method of claim 19, wherein the first portion comprises a top portion of the picture and the second portion comprises a row of the still image data for the at least one individual authorized to be in the structure arranged along a bottom portion of the picture.

* * * * *